United States Patent

Siring et al.

[11] Patent Number: 5,810,413
[45] Date of Patent: Sep. 22, 1998

[54] STORAGE DEVICE

[75] Inventors: Harald Siring; Jan-Patrick Kokott, both of Munich, Germany

[73] Assignee: Bayerische Motoren Werke Aktiengesellschaft, Munich, Germany

[21] Appl. No.: 743,241

[22] Filed: Nov. 4, 1996

[30] Foreign Application Priority Data

Nov. 4, 1995 [DE] Germany .................. 195 41 168.4

[51] Int. Cl.⁶ ...................................... B60J 7/20
[52] U.S. Cl. .................. 296/37.5; 160/183; 296/124
[58] Field of Search .................. 296/37.1, 37.5, 296/37.8, 37.16, 136, 124; 220/529, 531; 160/183, 210, 213

[56] References Cited

U.S. PATENT DOCUMENTS

| | | | |
|---|---|---|---|
| 3,951,446 | 4/1976 | Zehnder et al. | 296/37.16 |
| 4,536,025 | 8/1985 | Yamawaki et al. | 296/37.5 |
| 4,749,226 | 6/1988 | Heft | 296/37.6 |
| 4,969,679 | 11/1990 | Eyb | 296/136 |

FOREIGN PATENT DOCUMENTS

| | | |
|---|---|---|
| 0283363 | 9/1988 | European Pat. Off. . |
| 0 356 640 | 3/1990 | European Pat. Off. . |
| 1572209 | 5/1969 | France . |
| 304035 | 4/1917 | Germany . |
| 1 505 474 | 7/1969 | Germany . |
| 38 29 346 | 3/1990 | Germany . |
| 43 30 411 | 10/1994 | Germany . |
| 0285431 | 11/1989 | Japan . |

*Primary Examiner*—Dennis H. Pedder
*Attorney, Agent, or Firm*—Evenson, McKeown, Edwards & Lenahan, P.L.L.C.

[57] ABSTRACT

Storage device having two storage spaces whose volume can be changed by an adjustable separating wall, particularly on a convertible or the like, is provided. The separating wall has three plate-shaped elements, a center element of which on opposite end areas, in each case swivellably about an axis, being connected with an exterior element which in each case, swivellably about a stationary swivelling axis is fastened on the exterior end area, whereby the elements form a four-bar mechanism.

22 Claims, 4 Drawing Sheets

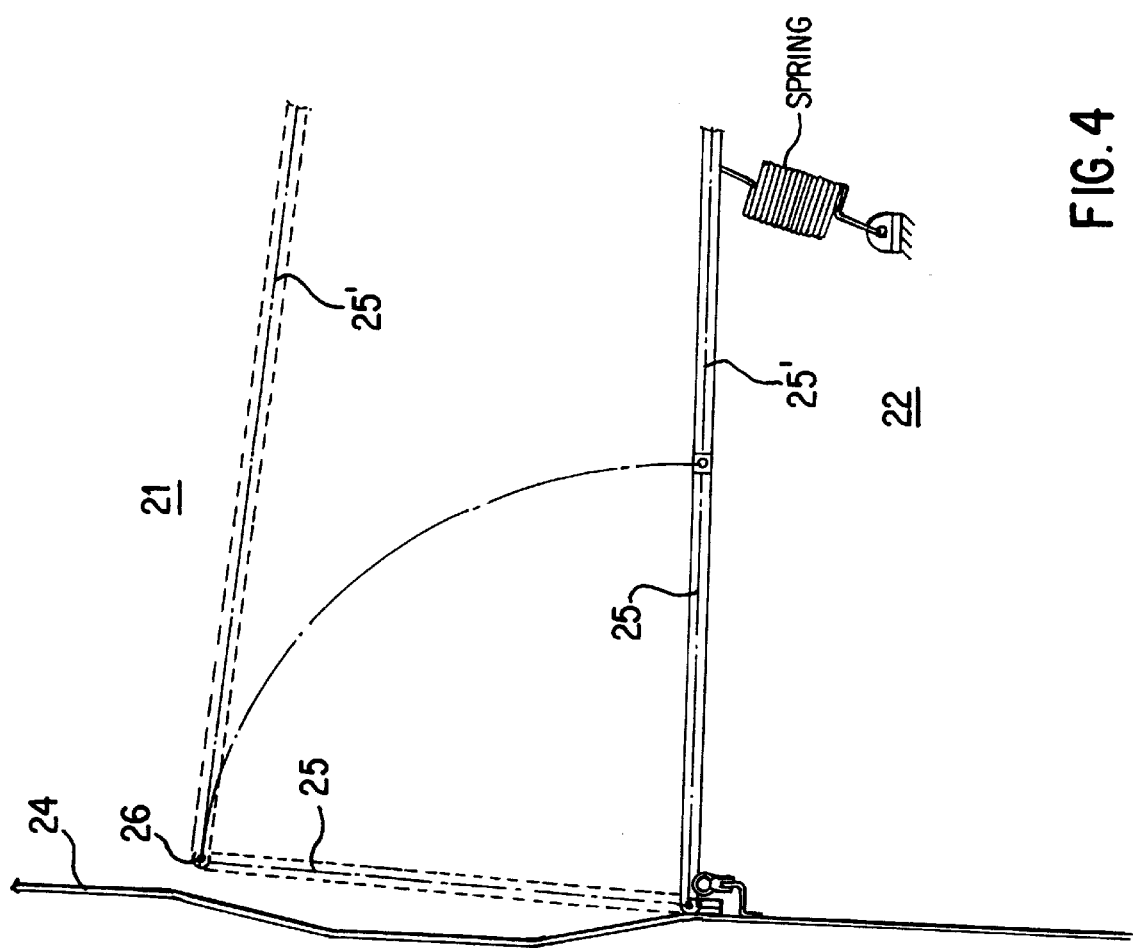

STORAGE DEVICE

BACKGROUND AND SUMMARY OF THE INVENTION

This invention relates to a storage device and, more particularly, to a storage device having two storage spaces which can be changed in their volume by way of an adjustable separating wall, particularly on a convertible or the like.

A storage device of the above-mentioned type is known from German patent Document DE-OS 15 05 474 which, for receiving a folding top, has a storage space separated from the trunk by a vertically adjustable separating wall. The adjusting mechanism, which is not shown and which permits a vertical adjustment of the separating wall, would require four slide guides in the corner areas of the separating wall which require high expenditures for their manufacturing and cannot exclude a jamming of the guides.

There is therefore needed a storage device which, in a simple manner, permits an adjusting of the separating wall which does not jam.

These needs are met by a storage device, having two storage spaces whose volume can be changed by means of an adjustable separating wall, particularly on a convertible or the like, wherein the separating wall has three plate-shaped elements, of which a center element on opposite end areas swivellably about an axis is connected with exterior elements which are each swivellable about a stationary swivelling axis, fastened on the exterior end area, whereby a four-bar mechanism is formed by the elements.

By means of the articulated connections of the three elements forming the separating wall and the swivellably supported exterior elements, the elements form a four-bar mechanism which can be adjusted free of play and jamming. The movability of the four-bar mechanism must be adapted by the position of the axes and swivelling axes to the respective mounting conditions. If the axes and the swivelling axes extend approximately in parallel, by means of a suitable selection of the horizontal and vertical distance between the swivelling axes, an approximately parallelepiped-shaped enlargement or reduction of the storage spaces can be achieved.

The storage device is particularly suitable for use in a convertible or the like in the case of which a folding top or folding roof is to be accommodated in one storage space and luggage is to be stored in the other storage space. If, in this case, the folding top or folding roof is closed, the three elements of the separating wall can be adjusted into the storage space provided for receiving the folding roof or folding top and, as a result, correspondingly enlarge the storage space provided for receiving luggage pieces, whereby larger or additional pieces of luggage can be carried along in this space.

Other objects, advantages and novel features of the present invention will become apparent from the following detailed description of the invention when considered in conjunction with the accompanying drawings.

DETAILED DESCRIPTION OF THE DRAWINGS

Figure 1:
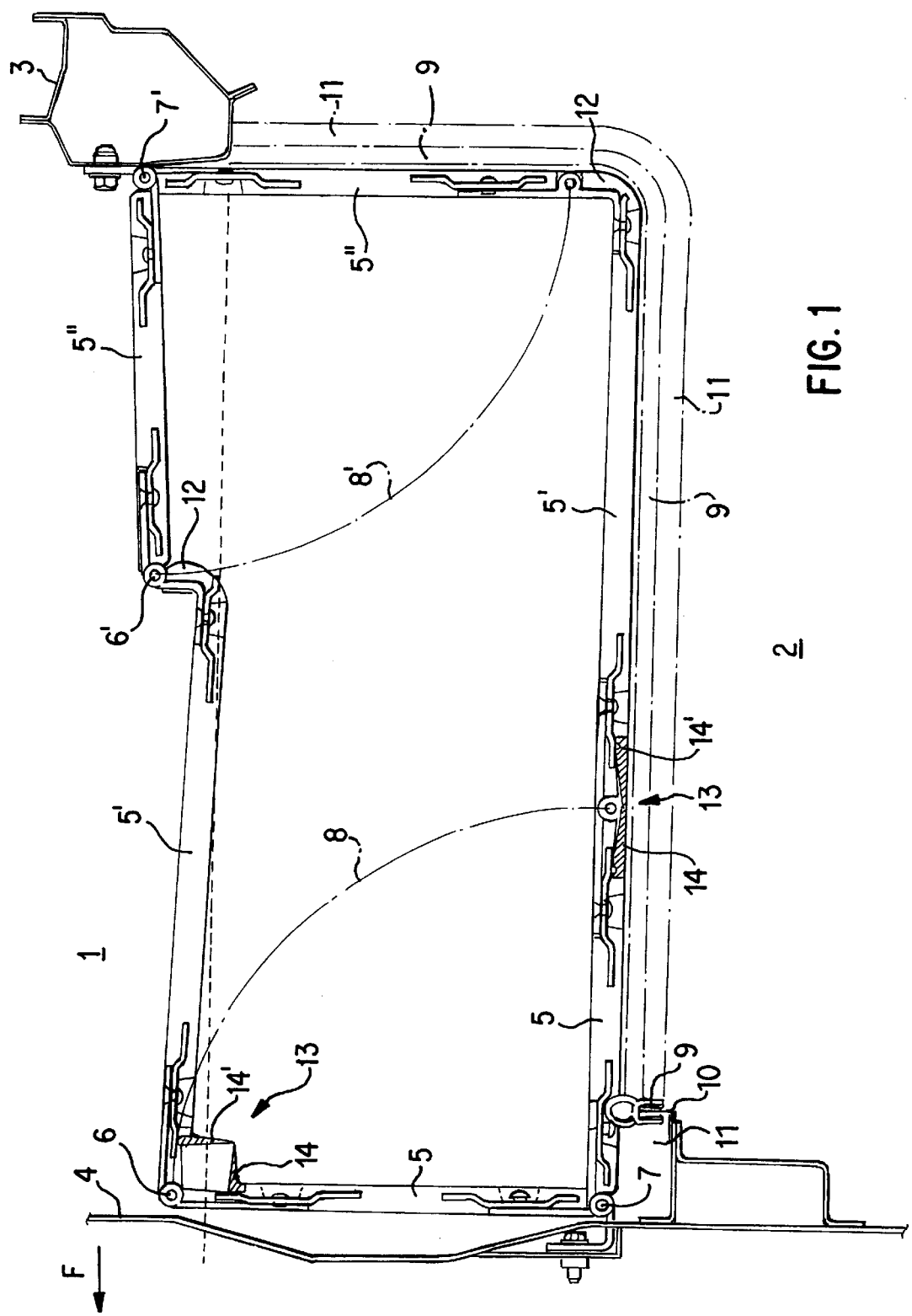
FIG. 1 is a lateral sectional view of a first embodiment according to the invention.

The first embodiment of a storage device illustrated in FIG. 1 is provided on a vehicle constructed as a convertible and permits an enlargement or reduction of the volume of the storage space provided for accommodating a folding top and, at the same time, a reduction or enlargement of a second storage space 2 provided for receiving pieces of luggage. In a manner which is not shown, the storage space 1 can be closed from above by a swivellable folding top compartment lid. The storage space 2 provided for receiving pieces of luggage can be closed behind a cross member 3—on the right in the figure—by means of a trunk lid (not shown) which is swivellably supported on the cross member 3. The folding top compartment lid is also swivellably supported on the cross member 3.

The driving direction of the vehicle toward the, front is illustrated in the figure by an arrow F. The storage space 1 is provided in the forward upper area of the storage space 2 behind a transverse wall 4 which bounds the passenger compartment toward the rear.

The two storage spaces 1, 2 can be changed in their volume by way of an adjustable separating wall which is formed of essentially three plate-shaped elements, 5, 5', 5". On the forward and rearward end area, the center element 5' is in each case swivellably connected with the forward exterior element 5 and the rearward exterior element 5" about an axis 6, 6'. The forward exterior element 5 is fastened swivellably about a swivelling axis 7 on the rear side of the transverse wall 4. In a similar manner, the rearward exterior element 5" is swivellably fastened on a swivelling axis 7' on the front side of the cross member 3, in which case the swivelling axis 7' is situated higher than the swivelling axis 7 approximately by the distance between the swivelling axis 7 and the axis 6. The longitudinal distance between the swivelling axes 7, 7' corresponds approximately to the combined distances between the axes 6, 6' and the axis 6' to the swivelling axis 7'.

In the illustrated upright position of the center element 5', the imaginary connection planes between the parallel axes 6, 6' as well as between the axis 6' and the swivelling axis 7' extend approximately in parallel. The axis 6 is situated approximately above the swivelling axis 7, whereby the element 5 is set almost vertically. All axes 6, 6' and 7, 7' extend in parallel in the transverse direction of the vehicle. In this upright loading position, the folding top is taken out of the storage space and closed. As a result, the storage space 2 provided for the accommodation of pieces of luggage is enlarged as a result and the not required storage space 1 is correspondingly reduced in its volume. It is indicated by the dash-dotted circular arcs 8, 8' that by the corresponding swivelling of the exterior elements 5, 5", the elements 5, 5', 5" can be adjusted into a lower loading position in which the elements 5, 5' are arranged approximately horizontally and the element 5" is arranged approximately vertically. The elements 5, 5', 5" forming a four-bar mechanism can be adjusted in the indicated manner because the swivelling axes 7, 7' have a distance from one another which is less than the sum of the distances between the axis 6 and the swivelling axis 7 as well as the axis 6' to the swivelling axis 7' and between the axes 6, 6'.

In the lowered loading position, the elements 5, 5', 5" rest against a seal 9 which is fastened to a leg 10 of a water groove 11 pointing to the elements 5, 5', 5". On the top, the water groove 11 extends open behind the transverse wall 4 in the transverse direction of the vehicle as well as laterally of the elements 5, 5', 5" toward the rear and in the rearward area of the storage space 1 in the upward direction to the cross member 3, in which case, in this vertical section, the water groove 11 is open in the front.

On the area of the center element 5', which is on the right in the figure, the axis 6' is constructed on an upward-directed leg 12 of the element 5'. On the axis 6, a bendable seal 13 is provided which consists of two sealing parts 14, 14' connected by way of a film hinge. The ends of the sealing parts 14, 14' are fastened to the element 5 or to the center element 5' in such a manner that, in the upper and the lower loading position, the sealing parts 14, 14' take up the positions indicated in the figure. In the lower loading position, the undersides of the sealing parts 14, 14' are arranged flush with the elements 5, 5' and are in a sealing contact in the area of the seal 9. The elements 5, 5', 5" can be adjusted by a motor drive which is not shown and which has, for example, a vertically adjustable control element on which one end of an adjusting rod is pivotally connected which, on its other end, is applied to the center element 5' and adjusts it in the upward and downward direction.

Figure 2:
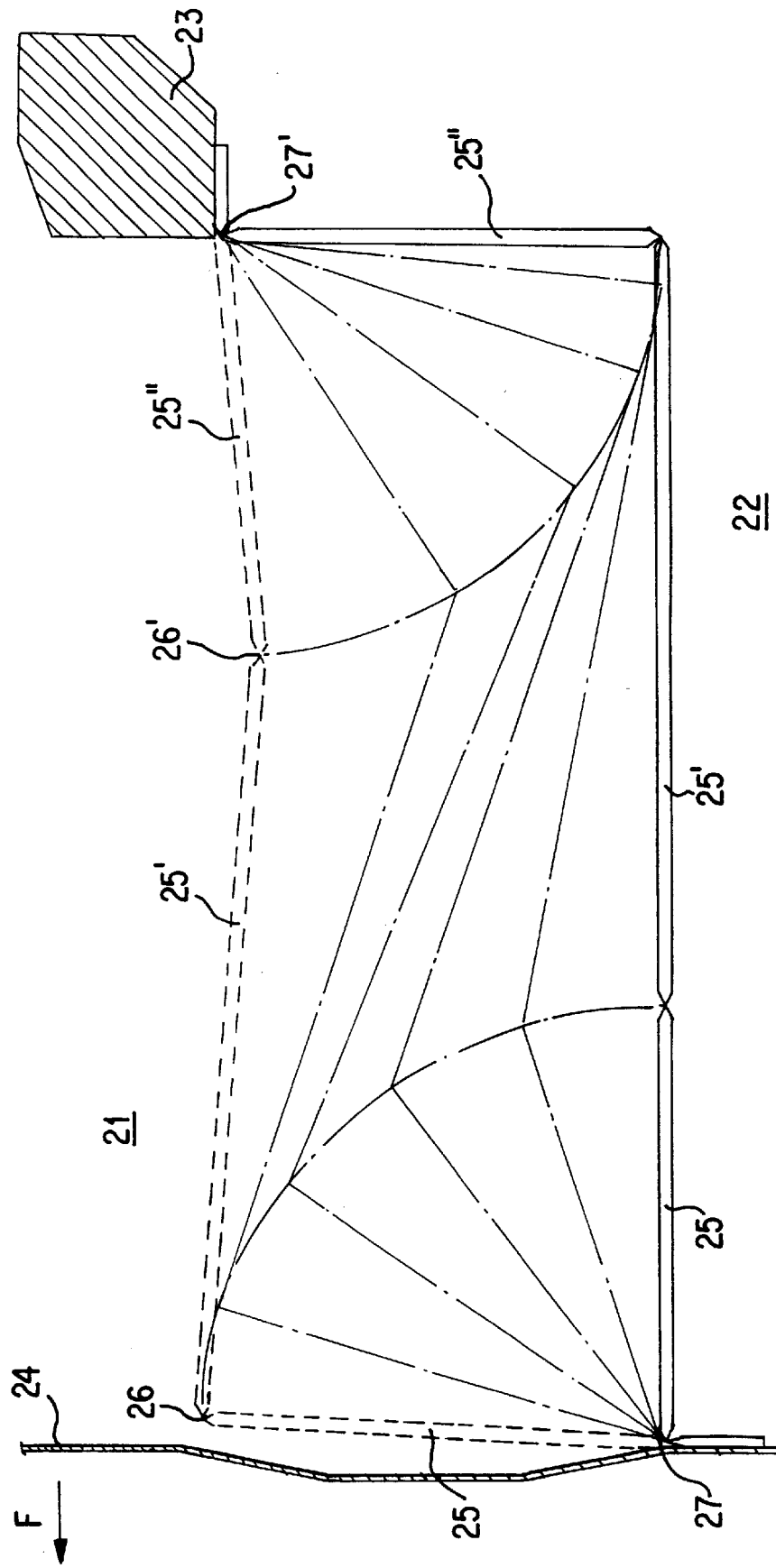
FIG. 2 is a view of a second embodiment corresponding to FIG. 1.

A second embodiment of the invention is illustrated in FIG. 2 in a schematic diagram. Comparable parts of the embodiment in FIG. 2 with respect to those of FIG. 1 have a reference number increased by the number 20 in order to avoid another description of these parts. In this embodiment, the axes 26, 26' extending in the transverse direction of the vehicle and the swivelling axes 27, 27' are formed by film hinges or the like, for example, fabric seams. For example, on their side facing the storage space 22, the elements 25, 25', 25" can be covered by a web of fabric or the like which, on the ends, is fastened, on the one side on the cross member 23 and, on the other side, on the transverse wall 24. By means of dash-dotted lines, various positions of the elements 25, 25', 25" are illustrated during the transition from the lower loading position into the upper loading position. For simplifying the representation, in this embodiment the elements 25, 25', 25" are illustrated as flat plate-shaped parts. These may also extend in a shaped manner or may be bent in various areas.

Figure 3:
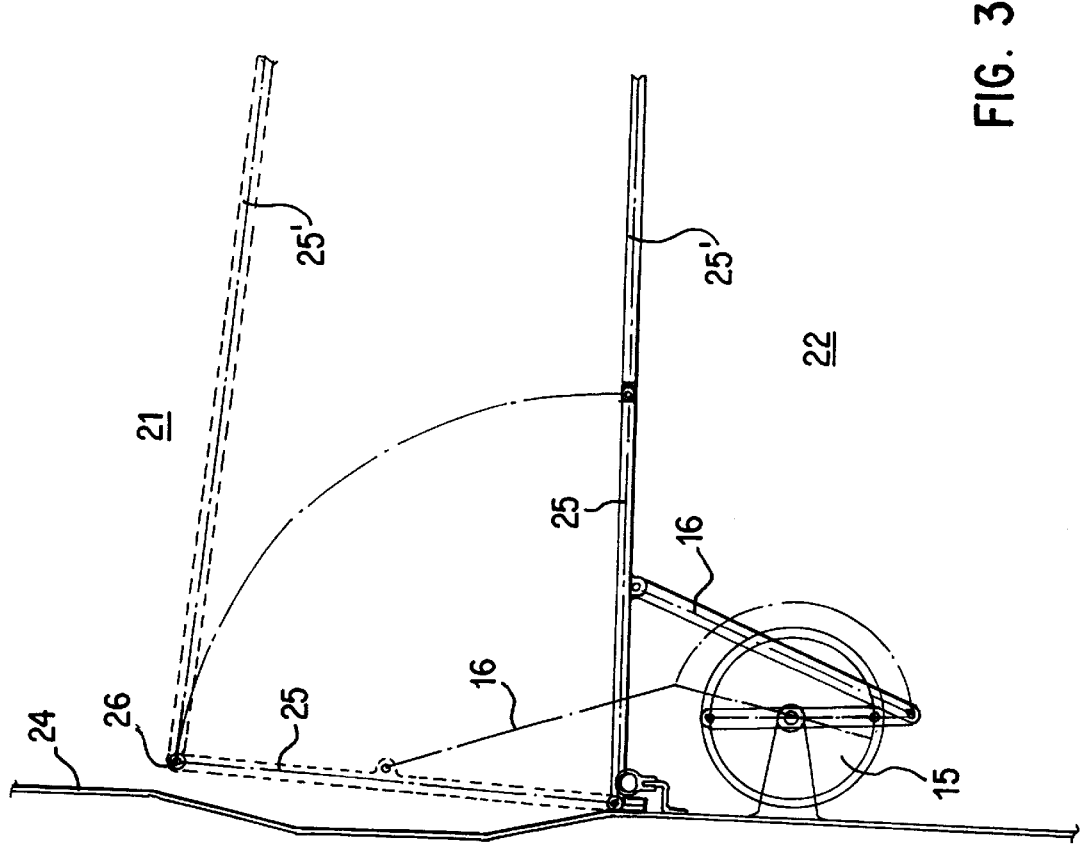
FIG. 3 is a view of a motor drive for adjusting an element of the storage device according to the invention illustrated in FIG. 2.

The representation according to FIG. 3 includes a drive 15 which is supported on the transverse wall 24 and which adjusts the element 25 of the second embodiment according to FIG. 2 by way of a connecting rod 16 which is applied to the element 25 in an articulated manner. The lower loading position is illustrated by unbroken contours while the broken contours indicate the upper loading position in which the folding top is not accommodated in the storage space 21.

The invention can also be implemented in a manner which deviates from the two described embodiments. For adjusting the elements from a first loading position into a second loading position, a motor drive is not required if, for example, a spring element loads the elements into a loading position and a part resting against an element, during the entering into a storage space, automatically adjusts the elements into the other loading position. The plate-shaped elements can be constructed to be plane, curved or structured. The local assignment of the two storage spaces per se is arbitrary. The plate-shaped elements can have a different or the same size. It is not required in every case that the swivelling axes and the axes extend in parallel to one another. On the side areas of the adjustable separating wall, flaps or covers can be arranged which, as in the embodiment, in the top loading position or in a lower loading position, completely or partially cover open side areas between the elements and adjacent wall areas.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A storage device, comprising:

two storage spaces;

an adjustable separating wall which changes a volume of said two storage spaces;

wherein said adjustable separating wall comprises three plate-shaped elements, a center one of said three plate-shaped elements being swivellably connected about movable axes on opposite end areas with exterior ones of said three plate-shaped elements, said exterior ones of said three plate-shaped elements being swivellably fastened at exterior end areas about first and second stationary swivelling axes, respectively.

2. The storage device according to claim 1, wherein said movable axes extend approximately in parallel to said stationary swivelling axes.

3. The storage device according to claim 1, wherein said exterior ones of said three plate-shaped elements are swivellable about approximately 90° between a first and a second loading position, respectively.

4. The storage device according to claim 2, wherein said exterior ones of said three plate-shaped elements are swivellable about approximately 90° between a first and a second loading position, respectively.

5. The storage device according to claim 3, wherein in said first loading position, a first imaginary plane extending between said movable axes and a second imaginary plane extending between one of said movable axes and a facing one of said first and second stationary swivelling axes of a first of said exterior ones of said three plate-shaped elements, extend approximately in parallel; and wherein a second of said exterior ones of said three plate-shaped elements is arranged approximately vertically to the first and second imaginary planes.

6. The storage device according to claim 4, wherein in said first loading position, a first imaginary plane extending between said movable axes and a second imaginary plane extending between one of said movable axes and a facing one of said first and second stationary swivelling axes of a first of said exterior ones of said three plate-shaped elements, extend approximately in parallel; and wherein a second of said exterior ones of said three plate-shaped elements is arranged approximately vertically to the first and second imaginary planes.

7. The storage device according to claim 5, wherein in said second loading position, a third imaginary plane extending between said movable axes and a fourth imaginary plane extending between another one of said movable axes and a corresponding facing one of said stationary swivelling axes of another exterior one of said three plate-shaped elements extend approximately in parallel; and wherein said first exterior one of said three plate-shaped elements is arranged approximately vertically to the third and fourth imaginary planes.

8. The storage device according to claim 6, wherein in said second loading position, a third imaginary plane extending between said movable axes and a fourth imaginary plane extending between another one of said movable axes and a corresponding facing one of said stationary swivelling axes of another exterior one of said three plate-shaped elements extend approximately in parallel; and wherein said first exterior one of said three plate-shaped elements is arranged approximately vertically to the third and fourth imaginary planes.

9. The storage device according to claim 5, wherein in said first loading position, said center element is raised and in said second loading position, said center element is lowered.

10. The storage device according to claim 6, wherein in said first loading position, said center element is raised and in said second loading position, said center element is lowered.

11. The storage device according to claim 7, wherein in said first loading position, said center element is raised and in said second loading position, said center element is lowered.

12. The storage device according to claim 8, wherein in said first loading position, said center element is raised and in said second loading position, said center element is lowered.

13. The storage device according to claim 1, wherein said storage device is provided on a convertible vehicle; and wherein one of said two storage spaces is a rearward luggage compartment and another of said two storage spaces is a folding top compartment provided in a front area above said rearward luggage compartment into which an opened folding top or folding roof is to be stowed.

14. The storage device according to claim 7, wherein said movable axes and said stationary swivelling axes extend in a transverse direction of said vehicle.

15. The storage device according to claim 3, wherein in said second loading position, said three plate-shaped elements rest above and against a seal.

16. The storage device according to claim 14, wherein in said second loading position, said three plate-shaped elements rest above and against a seal.

17. The storage device according to claim 15, wherein said seal is fastened on a leg of a water groove pointing to said three plate-shaped elements, said water groove, on a transverse wall bounding said luggage compartment in the front, in the transverse direction as well as laterally of said three plate-shaped elements, is open on a top surface extending to the rear and, in a rearward area of said folding top compartment is open in the front and extends in an upward direction.

18. The storage device according to claim 16, wherein said seal is fastened on a leg of a water groove pointing to said three plate-shaped elements, said water groove, on a transverse wall bounding said luggage compartment in the front, in the transverse direction as well as laterally of said three plate-shaped elements, is open on a top surface extending to the rear and, in a rearward area of said folding top compartment is open in the front and extends in an upward direction.

19. The storage device according to claim 1, further comprising a bendable seal fastened to a corresponding one of said three plate-shaped elements in an area of one of said axes, said bendable seal preventing a transfer of water from one storage space into another storage space.

20. The storage device according to claim 1, further comprising a drive applied to one of said three plate-shaped elements for adjusting said three plate-shaped elements.

21. The storage device according to claim 1, further comprising a spring applied to one of said three plate-shaped elements, said spring loading a center one of said three plate-shaped elements in an upward direction.

22. A storage device, comprising:

a storage housing having two storage spaces;

an adjustable separating wall which changes a volume of said two storage spaces;

wherein said adjustable separating wall comprises three plate-shaped elements, a center one of said three plate-shaped elements being swivellably connected about movable axes on opposite end areas with exterior ones of said three plate-shaped elements, said exterior ones of said three plate-shaped elements being swivellably fastened on exterior end areas about first and second stationary swivelling axes fixed to the storage housing.

\* \* \* \* \*